United States Patent [19]

Otani

[11] 4,204,720

[45] May 27, 1980

[54] CLUTCH RELEASE BEARING ASSEMBLY

[75] Inventor: Hisao Otani, Toyota, Japan

[73] Assignee: Toyota Jidosha Kogyo Kabushiki Kaisha, Aichi, Japan

[21] Appl. No.: 927,534

[22] Filed: Jul. 24, 1978

[30] Foreign Application Priority Data

Nov. 2, 1977 [JP] Japan .............................. 52-147803[U]

[51] Int. Cl.² .............................................. F16C 19/10
[52] U.S. Cl. ........................................ 308/233; 192/98
[58] Field of Search ................ 192/98, 110 B, 113 R; 308/230, 233, 36.1, 36.4, 187.1, 187.2, 187

[56] References Cited

U.S. PATENT DOCUMENTS

| 3,877,558 | 4/1975 | Endo .............................. 192/110 B X |
| 3,921,776 | 11/1975 | Sonnerat .............................. 192/98 |

Primary Examiner—Frederick R. Schmidt
Attorney, Agent, or Firm—Stevens, Davis, Miller & Mosher

[57] ABSTRACT

A clutch release bearing assembly, having a rotatable outer race and a pair of shielding plates mounted on the outer race to seal the interior of the bearing assembly, which is provided with a plurality of exhaust passages radially extending from a space formed on the outside of at least one of the shielding plates to the exterior of the bearing assembly.

12 Claims, 6 Drawing Figures

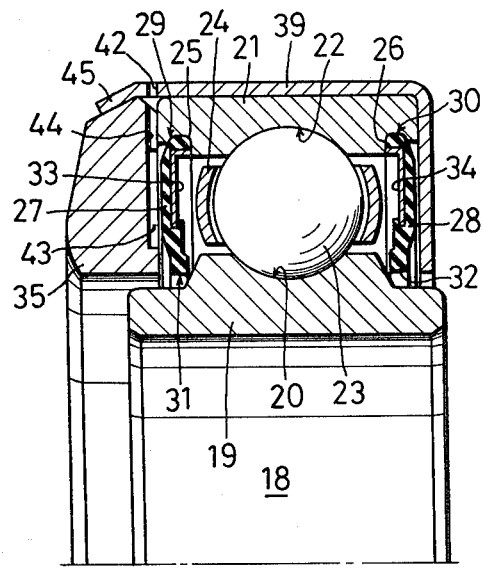
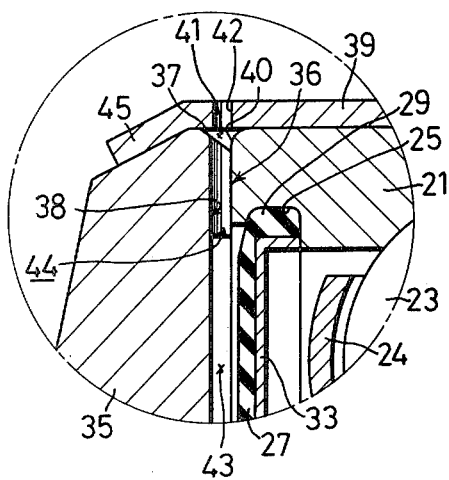
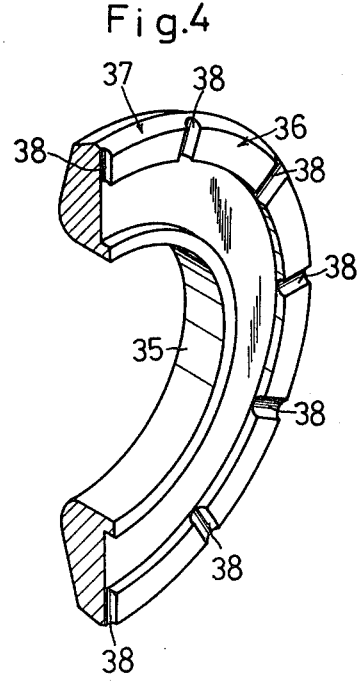

CLUTCH RELEASE BEARING ASSEMBLY

The present invention relates to a clutch release bearing for a motor vehicle, and more particularly, to a clutch release bearing assembly including an outer race adapted to rotate in contact with a member of the clutch cover assembly such as a diaphragm spring and shielding plates provided in the inner part of the outer race to provide an improved sealed construction of the bearing assembly.

It is no exaggeration to say that the durability of a clutch release bearing assembly is almost entirely determined by the life of grease contained in the bearing assembly. Muddy water entering the bearing assembly tends to lower the viscosity of the grease and cause its outflow from the bearing assembly or lower its lubricating function. Further, muddy water often does damage to the surfaces of races and balls.

There has been provided a clutch release bearing assembly having shielding plates inside the outer race to prevent entry of muddy water into the bearing assembly and outflow of grease therefrom. However, in this type of clutch release bearing assembly having a rotatable outer race, a side plate is spaced outwardly from one of the shielding plates and muddy water which has once sticked to the inner surface of the side plate of the outer race enters the interior of the bearing with rotation of the outer race. Namely, the muddy water is collected in a space between the side plate of the outer race and the shielding plate, and since the muddy water cannot be discharged from the space, it enters the interior of the bearing containing grease through a space between the shielding plate and the inner race. Consequently, it causes outflow of the grease from the bearing and lowering of its lubricating function, and thus the durability of the bearing is considerably decreased.

It is an object of the present invention to provide a clutch release bearing assembly which can quickly discharge any incoming muddy water from a space formed in the exterior of a shielding plate by centrifugal force consequent upon rotation of an outer race to prevent grease contained in the bearing assembly from being deteriorated or lowered in viscosity by the muddy water, and keep races and balls from being flawed by the muddy water.

It is another object of the present invention to provide a clutch release bearing assembly which can also quickly discharge muddy water from a clearance between the outer periphery of the inner race and the inner periphery of a cover into a space in the exterior of a shielding plate in the rear side of the bearing assembly.

According to the present invention, there is provided a clutch release bearing assembly having a rotatable outer race, a pair of shielding plates mounted on the outer race to seal the interior of the bearing assembly and a plurality of exhaust passages adapted to discharge muddy water from spaces between the side plate of the outer race and the shielding plate and between the shielding plate and a bearing cover by centrifugal force consequent upon rotation of the outer race. The side plate is produced by molding to have radial grooves and a beveled outer periphery, and has self-lubricating function. The outer race has a annular groove in its outer periphery and a plurality of radial holes running from the annular groove to a space in the bearing assembly while the bearing cover has a plurality of small holes which communicate with the annular groove to define the exhaust passages. The radial holes in the outer race and the small holes in the cover are easily communicated through the annular groove in the outer periphery of the outer race.

The invention will now be described in further detail by way of example with reference to the accompanying drawings, in which:

FIG. 2 is an enlarged cross-sectional partial view of the clutch release bearing assembly shown in FIG. 1;

FIG. 3 is a partially enlarged cross-sectional view of FIG. 2;

FIG. 4 is a perspective view of the side plate cut in half;

Figure 1:
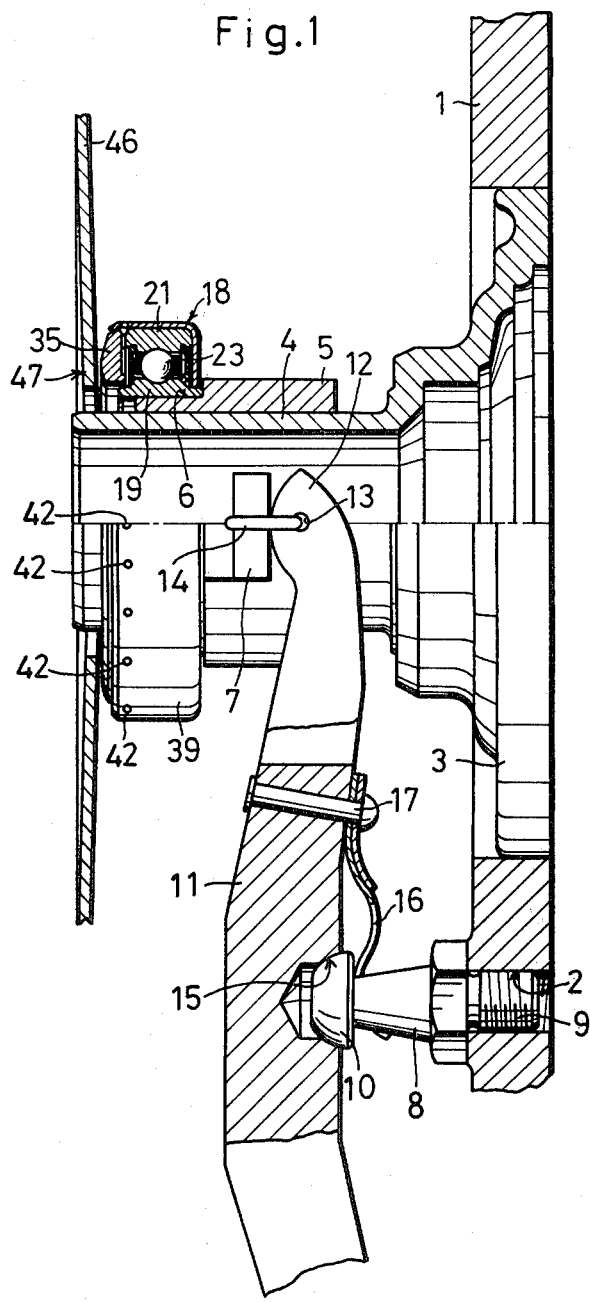
FIG. 1 is a partially fragmentary cross sectional view of a clutch release system in which the bearing assembly of the present invention is applied.

Referring now to FIG. 1 of the drawings, there is shown a clutch release system of a vehicle partly in section. Numeral 1 shows a clutch housing which is adjacent to a transmission (not shown). A bearing retainer 3 is integrally connected with a cylindrical portion 4 projecting toward the front side of the transmission, namely, the left-hand side in FIG. 1. A clutch release bearing hub 5 is mounted on the outer periphery of the cylindrical portion 4 to move along the axis thereof.

A release fork bowl 8 is secured to the clutch housing 1 by a male screw 9 threaded into a thread hole 2 in the clutch housing 1. The release fork bowl 8 is provided with a convexly spherical front end 10 which supports a concavely spherical surface 15 formed in the rear surface of a clutch release fork 11. The clutch release fork 11 is connected to the release fork bowl 8 by a leaf spring 16 which is fixed to the rear surface of the clutch release fork 11 by a rivet 17.

The clutch release fork 11 is provided with forked ends 12 each having a hole 13 into which an end of a clip 14 is inserted. The other end of the clip 14 is inserted into a hole (not shown) made in each of a pair of projections 7 formed on the outer periphery of the clutch release bearing hub 5. Namely, the forked ends 12 of the release fork 11 are connected to the projections 7 of the clutch release bearing hub 5 by a pair of clips 14. The outer periphery of the clutch release bearing hub 5 forms, as shown on the left-hand side of FIG. 1, a small diameter portion 6 into which the inner race 19 of a clutch release bearing assembly 18 is tightly fitted.

In FIG. 2 showing a cross section of the clutch release bearing assembly 18, the outer peripheral portion of the inner race 19 and the inner peripheral portion of an outer race 21 define spherical grooves 20 and 22 respectively. A series of ball bearings 23 are retained between the inner and outer races 19 and 21 to roll along the grooves 20 and 22. The ball bearings 23 are arranged at certain intervals by a cage 24 which is well known in the art.

The outer race 21 has at the outer ends of its inner periphery with a pair of annular grooves 25 and 26 to receive the outer peripheries 29 and 30 of discoidal shielding plates 27 and 28 of elastic material, such as rubber, having center holes. The shielding plates 27 and 28 are secured to the outer race 21 by calking. Between each of the inner peripheries 31 and 32 of the shielding plates 27 and 28 and the outer periphery of the inner race 19, there is defined a clearance which is sized small so that grease will not flow out from between the inner and outer races 19 and 21 and muddy water will not enter into the interior of the clutch release bearing assembly 18. The shielding plates 27 and 28 are provided with reiforcing plates 33 and 34 of metal respectively in the inner sides opposite to the ball bearings 23.

The outer race 21 is detachably fitted with an annular side plate 35 in the front end thereof. Namely, the side plate 35 is secured to the outer race 21 by an internally bent front peripheral portion of a cover 39 enclosing the outer race 21. In general, the side plate 35 is molded from sintered porous metal having self-lubricating function.

The side plate 35 is provided with a slightly projecting annular region 36 which is in surface contact with the front end of the outer race 21 and has a plurality of radial grooves 38 arranged along its circumference at certain intervals (see FIG. 4). The outer periphery 37 of the annular region 36 is beveled to define an annular groove 41 between the side plate 35 and the front outer periphery 40 of the outer race 21. The annular groove 41 communicates with a space 43 defined by the side plate 35 and the shielding plate 27 through the grooves 38. As shown in FIGS. 1 to 3, the cover 39 has a plurality of small holes 42 along its circumference at certain intervals to communicate with the annular groove 41. Thus, the grooves 38 in the side plate 35 and the small holes 42 in the cover 39 communicate with each other through the annular groove 41 regardless of deviation in circumferential positions. Namely, the space defined by the side plate 35 and the shielding plate 27 communicate with the exterior of the clutch release bearing assembly 18 through exhaust passages 44 defined by the grooves 38 of the side plate 35, the annular groove 41 and the small holes 42 of the cover 39. The radial grooves 38 can be made in the outer race 21 instead of the annular region 36.

When a clutch pedal (not shown) of the vehicle is worked, the clutch release fork 11 rotates counterclockwise (FIG. 1) about the front end 10 of the release fork bowl 8 to move the release bearing hub 5 into the left-hand direction along the cylindrical portion 4 of the bearing retainer 3. By virtue of this movement, the side plate 35 of the outer race 21 is pressed against a diaphragm spring 46 shown in FIG. 1. Since the diaphragm spring 46 is rotating by the torque transmitted from an engine (not shown), the side plate 35 rotates with the outer race 21 upon contact with the diaphragm spring 46. Upon further movement of the clutch release bearing assembly 18 with the release bearing hub 5, the innermost free ends 47 of the diaphragm spring 46 are pressed by the side plate 35 of the outer race 21 to move into the left-hand side of FIG. 1. By virtue of this, the transmission of torque from the engine is cut off to release the clutch.

When muddy water entering the clutch housing 1 reaches the side plate 35 of the outer race 21, it moves inwardly into the clutch release bearing assembly 18. In this case, it is unavoidable that the muddy water enters the space 43 between the shielding plate 27 and the side plate 35 through the clearance between the side plate 35 and the inner race 19. Further, it is apprehended in the conventional clutch release bearing that muddy water enters the inner part of the clutch release bearing assembly 18 containing grease through the clearance between the inner race 19 and the inner periphery 31 of the shielding plate 27.

In the present invention, however, the muddy water entering the space 43 is quickly discharged through the grooves 38 in the region 36 of the side plate 35, the annular groove 41 defined by the side plate 35, the outer race 21 and the cover 39 and the small holes 42 in the cover 39 by centrifugal force consequent upon rotation of the outer race 21 and the side plate 35. Thus, the muddy water is effectively prevented from entering the inner part containing grease between the shielding plates 27 and 28.

Figure 5:
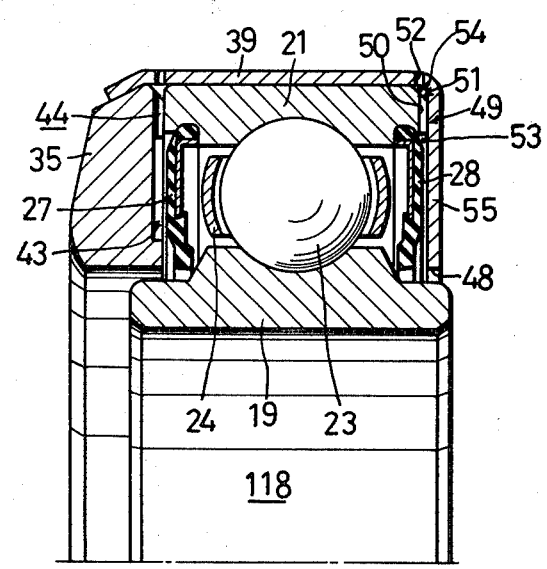
FIG. 5 is a cross-sectional partial view showing a second embodiment of the present invention.

While most of the muddy water is to enter the inner part of the clutch release bearing assembly 18 from the front side thereof as hereinabove described, the remainder of the muddy water is to enter the same from the rear side. FIG. 5 shows a second embodiment of the present invention adapted to prevent entering of muddy water from the rear side.

In the construction as shown in FIG. 5, the outer race 21 has a plurality of radial grooves 50 in its rear end 49 along its circumference. The outer periphery 51 of the rear side of the outer race 21 is beveled to define an annular groove 54 between the inner periphery of the cover 39 and the outer periphery of the outer race 21. The annular groove 54 communicates with a space 53 defined by the rear side 55 of the cover 39 and the shielding plate 28 through the grooves 50. The cover 39 has a plurality of small holes 52 along its circumference at certain intervals to communicate with the annular groove.

Thus, muddy water entering the space 53 from the rear side of the clutch release bearing assembly 118 through the clearance between the outer periphery of the inner race 19 and the inner end 48 of the cover 39 is discharged through the groove 50, the annular groove 54 and the small holes 52 by centrifugal force consequent upon rotation of the outer race 21.

The other portions of the clutch release bearing asemly 118 shown in FIG. 5 are constructed identically with those of the bearing assembly 18 shown in FIGS. 1 to 4. Therefore, no further description of this bearing assembly 118 would be necessary to anyone of ordinary skill in the art.

Figure 6:
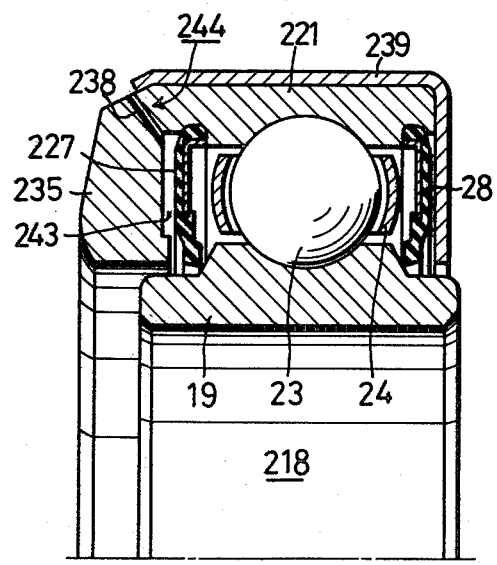
FIG. 6 is a cross-sectional partial view showing a third embodiment of the present invention.

FIG. 6 shows a third embodiment of the present invention in which the outer race 221 of a clutch release bearing assembly 218 is formed integrally with a side plate 235. This embodiment is adapted to discharge muddy water entering from the front side of the clutch release bearing assembly 218 into a space 243 between the side plate 235 and a shielding plate 227. The outer race 221 has in its uncovered portion a plurality of radial holes 238 inclined to bearing rotation axis to define exhaust passages 244 radially outwardly extending from the space 243 to the exterior of the bearing assembly 218. Since the radial holes 238 are made in the uncovered portion of the outer race 221, the cover 239 has no holes and the outer race 221 has no beveled portion to define an annular groove. Muddy water entering the space 243 is discharged through the exhaust passages 244 by centrifugal force consequent upon rotation of the outer race 221.

The other portions of the clutch release bearing assembly 218 shown in FIG. 6 are constructed identically with those of the bearing assemblies 18 and 118 shown in FIGS. 1 to 5. Therefore, no further description of this bearing assembly 218 would be necessary to anyone of ordinary skill in the art.

While the invention has been described with reference to a few preferred embodiments thereof, it is to be understood that modifications or variations may be easily made without departing from the scope of this invention which is defined by the appended claims.

What is claimed is:

1. A clutch release bearing assembly containing grease in the interior thereof, said assembly comprising:
   an outer race;
   a side plate coaxial with said outer race on one side thereof;
   a bearing cover enclosing said outer race and rotatable therewith;
   a pair of shielding plates on said outer race to sealingly close the interior of the bearing assembly, one of said shielding plates and said side plate defining an annular space therebetween exterior of said one shielding plate; and
   means defining a plurality of substantially radially extending exhaust passages fluidly communicating said annular space with the exterior of said bearing assembly, said passages extending radially outwardly from said annular space whereby muddy water can be discharged from the interior of the bearing assembly through said exhaust passages by centrigual force upon rotation of said outer race.

2. The clutch release bearing assembly as defined in claim 1 wherein said side plate is separate and detachable from said outer race.

3. The clutch release bearing assembly as defined in claim 1 wherein said side plate is integral with said outer race.

4. The clutch release bearing assembly as defined in claim 1 including further means defining a plurality of exhaust passages on the rear side of said bearing assembly.

5. A clutch release bearing assembly containing grease in the interior thereof, said assembly comprising:
   an outer race;
   a side plate coaxial with and separate and detachable from said outer race on one side thereof;
   a bearing cover enclosing said outer race and rotatable therewith;
   a pair of shielding plates on said outer race to sealingly close the interior of the bearing assembly, one of said shielding plates defining an annular space exterior thereof; and
   means defining a plurality of substantially radially extending exhaust passages fluidly communicating said annular space with the exterior of said bearing assembly, said means defining said exhaust passages are formed by an annular groove in the outer periphery of said side plate, a plurality of radial passages between said side plate and said outer race to communicate said annular groove with said annular space and a plurality of small holes in said bearing cover to communicate with said annular groove, said annular space being defined between said one of said shielding plates and said side plate.

6. The clutch release bearing assembly as defined in claim 5 wherein said outer race is provided in its front end surface contacting said side plate with a plurality of radial grooves which define said radial passages.

7. The clutch release bearing assembly as defined in claim 6 wherein said side plate is molded from sintered porous metal.

8. The clutch release bearing assembly as defined in claim 7 wherein said side plate is formed along its outer periphery with an integrally molded, slightly projecting annular region which contacts said outer race and in which said radial grooves are formed.

9. The clutch release bearing assembly as defined in claim 5 wherein said side plate has a beveled outer periphery around its rear end contacting said outer race, said beveled outer periphery defining said annular groove.

10. A clutch release bearing assembly containing grease in the interior thereof, said assembly comprising:
    an outer race;
    a side plate integral and coaxial with said outer race on one side thereof;
    a bearing cover enclosing said outer race and rotatable therewith;
    a pair of shielding plates on said outer race to sealingly close the interior of the bearing assembly, one of said shielding plates defining an annular space exterior thereof; and
    means defining a plurality of substantially radially extending exhaust passages fluidly communicating said annular space with the exterior of said bearing assembly, said means defining said exhaust passages comprising a plurality of holes in said outer race to communicate said annular space with the exterior of said bearing assembly.

11. A clutch release bearing assembly containing grease in the interior thereof, said assembly comprising:
    an outer race;
    a side plate coaxial with said outer race on one side thereof;
    a bearing cover enclosing said outer race and rotatable therewith;
    a pair of shielding plates on said outer race to sealingly close the interior of the bearing assembly, one of said shielding plates defining an annular space exterior thereof;
    means defining a plurality of substantially radially extending exhaust passages fluidly communicating said annular space with the exterior of said bearing assembly;
    a second annular space defined between the other one of said shielding plates and said cover; and
    further means defining a plurality of exhaust passages on the rear side of said bearing assembly, said further means defining said exhaust passages are formed by an annular groove in the rear outer periphery of said outer race, a plurality of radial passages in said outer race to communicate said annular groove with said second annular space in said bearing assembly and a plurality of small holes in said bearing cover to communicate said annular groove with the exterior of said bearing assembly.

12. The clutch release bearing assembly as defined in claim 11 wherein said outer race has a beveled outer periphery around its rear end, said beveled outer periphery defining said annular groove with said bearing cover.

* * * * *